(12) United States Patent
Bruerton

(10) Patent No.: US 8,376,668 B2
(45) Date of Patent: Feb. 19, 2013

(54) SHORT TAPPING MACHINE

(75) Inventor: Russell Bruerton, Braeside (AU)

(73) Assignee: Tyco Flow Control Pacific Pty. Ltd. (AU)

( * ) Notice: Subject to any disclaimer, the term of this patent is extended or adjusted under 35 U.S.C. 154(b) by 1119 days.

(21) Appl. No.: 12/116,404

(22) Filed: May 7, 2008

(65) Prior Publication Data

US 2008/0286059 A1    Nov. 20, 2008

(30) Foreign Application Priority Data

May 16, 2007 (AU) .................................. 2007902615

(51) Int. Cl.
*B23B 47/04* (2006.01)
(52) U.S. Cl. ........................................ 408/141; 408/138
(58) Field of Classification Search .................. 173/165; 408/141, 99–102, 111, 124, 128, 129, 137–138; B23B 41/08, 47/04, 47/06, 47/08, 47/16
See application file for complete search history.

(56) References Cited

U.S. PATENT DOCUMENTS

| | | | | |
|---|---|---|---|---|
| 3,640,147 A | * | 2/1972 | Fantoni | 74/89.36 |
| 3,885,635 A | * | 5/1975 | Menzel | 173/146 |
| 4,122,990 A | * | 10/1978 | Tasaki et al. | 228/2.3 |
| 4,123,187 A | * | 10/1978 | Turner | 408/17 |
| 4,362,444 A | * | 12/1982 | Watkins | 408/17 |
| 4,546,834 A | * | 10/1985 | Menzel | 173/146 |

* cited by examiner

*Primary Examiner* — Daniel Howell

(57) ABSTRACT

A drilling or tapping machine includes a housing having a front end through which a drill mounting stub projects; a drill shaft having an inner drill tube carrying a splined bush at a rear thereof and carrying the drill mounting stub at a front thereof, a support tube coaxial with the drill tube, having front and rear bearing nuts mounting the support tube on the drill tube for relative rotation; a spline shaft extending from rear to front through the drill tube, and slidably engaged within the splined bush whereby rotation thereof rotates the drill tube; a moving plate fixed to the rear bearing nut and moveable axially relative to the spline shaft, the moving plate engaging the drill tube to axially move the drill tube relative to the housing; a first drive rotating the spline shaft; and a second drive causing the moving plate to move axially.

8 Claims, 10 Drawing Sheets

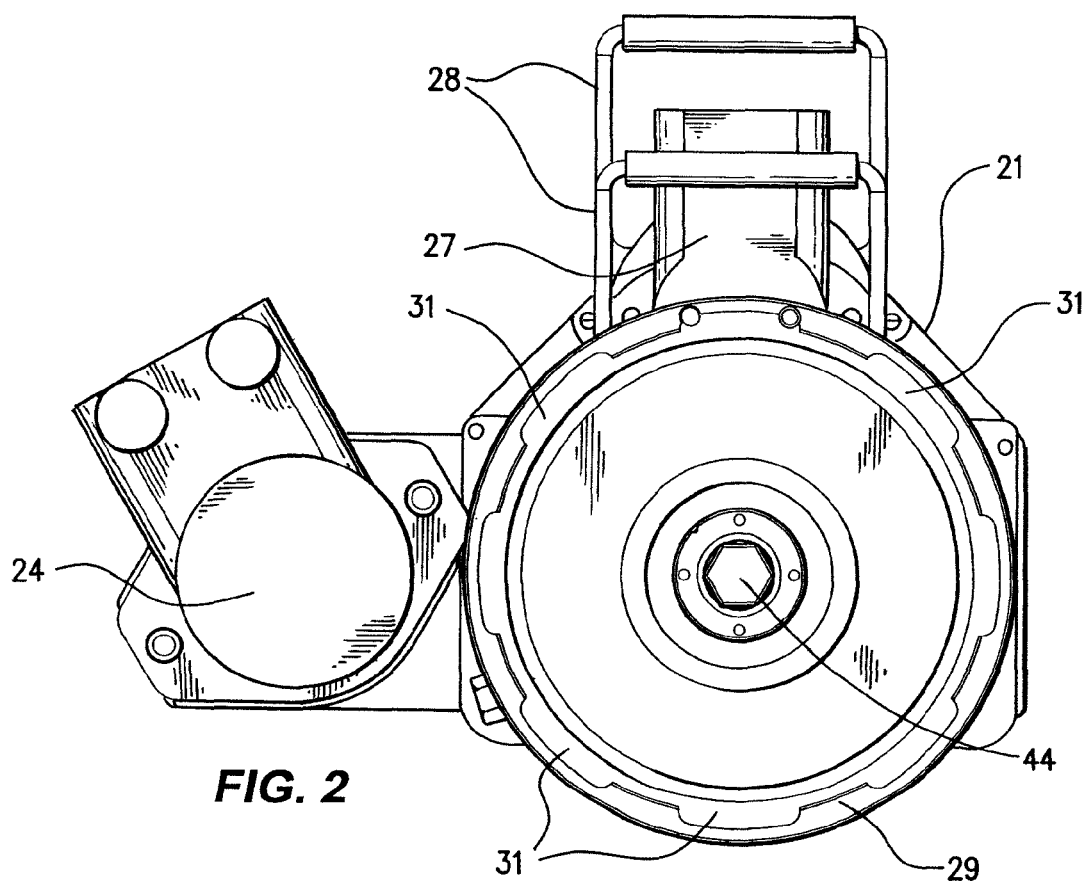
FIG. 2
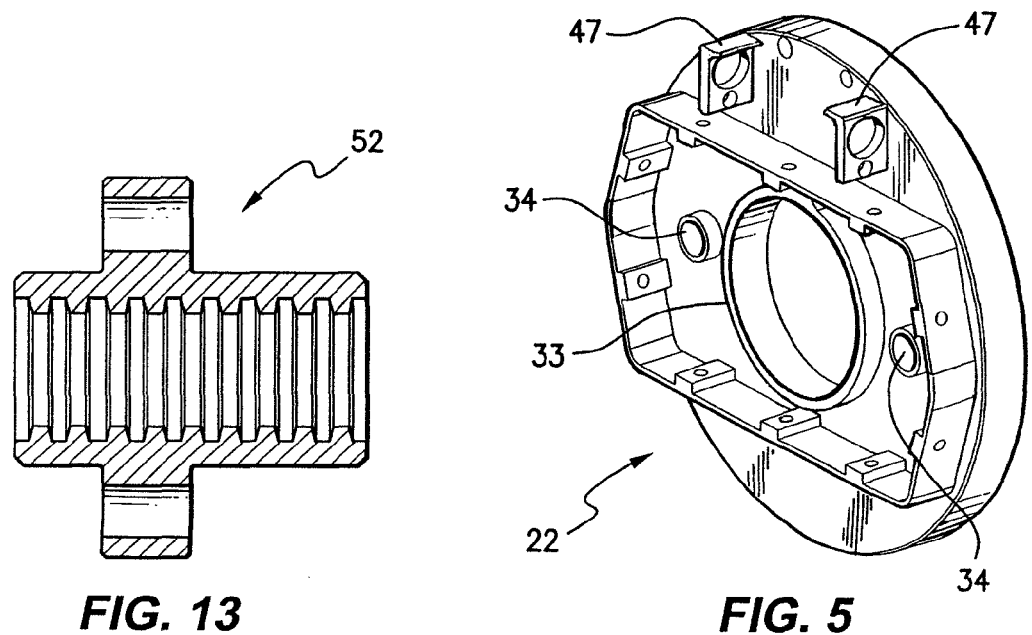
FIG. 13
FIG. 5

SHORT TAPPING MACHINE

CROSS-REFERENCE TO RELATED APPLICATIONS

The present application claims priority from Australian Provisional Patent Application No 2007902615 filed on 16 May 2007, the content of which is incorporated herein by reference.

BACKGROUND OF THE INVENTION

Various drilling or tapping machines have been proposed for hot tapping into pressurised mains. Typically, such tapping is accomplished by drilling into the main through a valve attached to the main. The valve may be directly attached, as by welding or clamping, or it may be mounted or attached using a stand pipe or branch pipe extending from the main. The valve minimises the amount of fluid that leaks or issues from the main when the drill penetrates the wall of the main.

This invention relates to a tapping or drilling machine and relates particularly to a machine adapted to tap or drill into a water or gas main or pipeline, a sewer, a vessel or other structure.

It is often necessary to tap or drill into a water or gas main while the main is in use. Such live or "hot" tapping of pressurised mains, particularly water mains, requires the use of a tapping machine engaged with the main.

Various drilling or tapping machines have been proposed for hot tapping into pressurised mains. Typically, such tapping is accomplished by drilling into the main through a valve attached to the main. The valve may be directly attached, as by welding or clamping, or it may be mounted on attached using a stand pipe or branch pipe extending from the main. The valve minimises the amount of fluid that leaks or issues from the main when the drill penetrates the wall of the main.

Because main, or pipeline, drilling or tapping often occurs in excavations made to expose the pipeline or main, minimising the extent of excavation required for a tapping process will substantially reduce the overall cost.

SUMMARY OF THE INVENTION

It is therefore desirable to provide a tapping machine which is able to be used for tapping pipelines or mains of a variety of sizes but which has a minimal length to facilitate its use.

It is also desirable to provide a drilling or tapping machine that is able to be used to drill or tap into pipelines or mains of a variety of sizes and materials, including steel, ductile iron or any rigid or semi-rigid material.

It is also desirable to provide a tapping machine for tapping pipelines and mains which is relatively simple in construction and easy to use.

It is also desirable to provide a tapping machine which, during use, maintains the integrity of the pipeline or main.

According to one aspect of the invention there is provided a drilling or tapping machine comprising an elongated housing having a front end through which a drill mounting stub projects;

a drill shaft having an inner, elongated drill tube carrying a splined bush at a rear end thereof and carrying the drill mounting stub at a front end thereof;

a support tube substantially coaxial with but spaced from the drill tube, the support tube having front and rear bearing nuts mounting the support tube on the drill tube for relative rotation;

a spline shaft extending through the drill tube from the rear end towards the front end, the spline shaft slidably engaged within the splined bush whereby rotation of the spline shaft rotates the drill tube in the housing;

a moving plate fixed to the rear bearing nut and moveable axially relative to the spline shaft, the moving plate adapted to engage the inner end of the drill tube to thereby axially move the drill tube relative to the housing;

first drive means to rotate said spline shaft; and second drive means to cause the moving plate to move in the axial direction.

Preferably, the first drive means comprises a hydraulic or electric motor mounted on the housing and connected to the spline shaft. In one form, the drive means comprises a battery or mains powered drill connected to the spline shaft through a gear or sprocket drive train.

In preferred embodiments, the second drive means includes a pair of threaded shafts extending substantially parallel with the spline shaft, the threaded shafts each carrying a nut connected to the moving plate. Preferably, the threaded shafts are rotated together by the second drive means, which may comprise a hydraulic or electric motor, preferably mounted on the housing. In one form, the second drive means comprises a battery or mains powered drill connected to the threaded shafts through a gear or sprocket drive train.

By forming the drill shaft as a tube located about the spline shaft, and by using a support tube to support the drill shaft during rotational movement thereof, the drill shaft is able to be rotated and axially moved relative to the front end of the housing to thereby drive a circular drill carried by the drill mounting stub. Preferably, the housing is adapted to be engaged with a pipeline or other structure to be drilled, generally through a valve which is secured to the pipeline or structure. The valve to which the front end of the housing is mounted allows the drill, drill shaft and support tube to pass there through so that the drill is able to engage with the pipeline or other structure and cut there from a coupon of the appropriate size to form the desired opening in the pipeline.

The valve is designed to seal the support tube so that, on penetration of the drill through the pipeline, fluid under pressure is retained within the valve structure. Partial withdrawal of the drill and drill tube and support tube enables the valve to be closed thereby preventing fluid leakage before fully withdrawing the drill.

In preferred forms of the invention, composite dry sliding bearings are used throughout the machine, in place of roller or ball bearings, or sintered bearings, to thereby minimise weight and size and thereby enable the structure to be of minimal size.

BRIEF DESCRIPTION OF THE DRAWINGS

In order that the invention will be more readily understood, one embodiment thereof will now be described with reference to the accompanying drawings and legend wherein:

FIG. 2 is a front elevational view of the machine of FIG. 1;

FIG. 5 is a perspective view of a front plate of the drilling machine;

FIG. 13 is a cross-sectional view of a screw nut;

DETAILED DESCRIPTION

Figure 1:
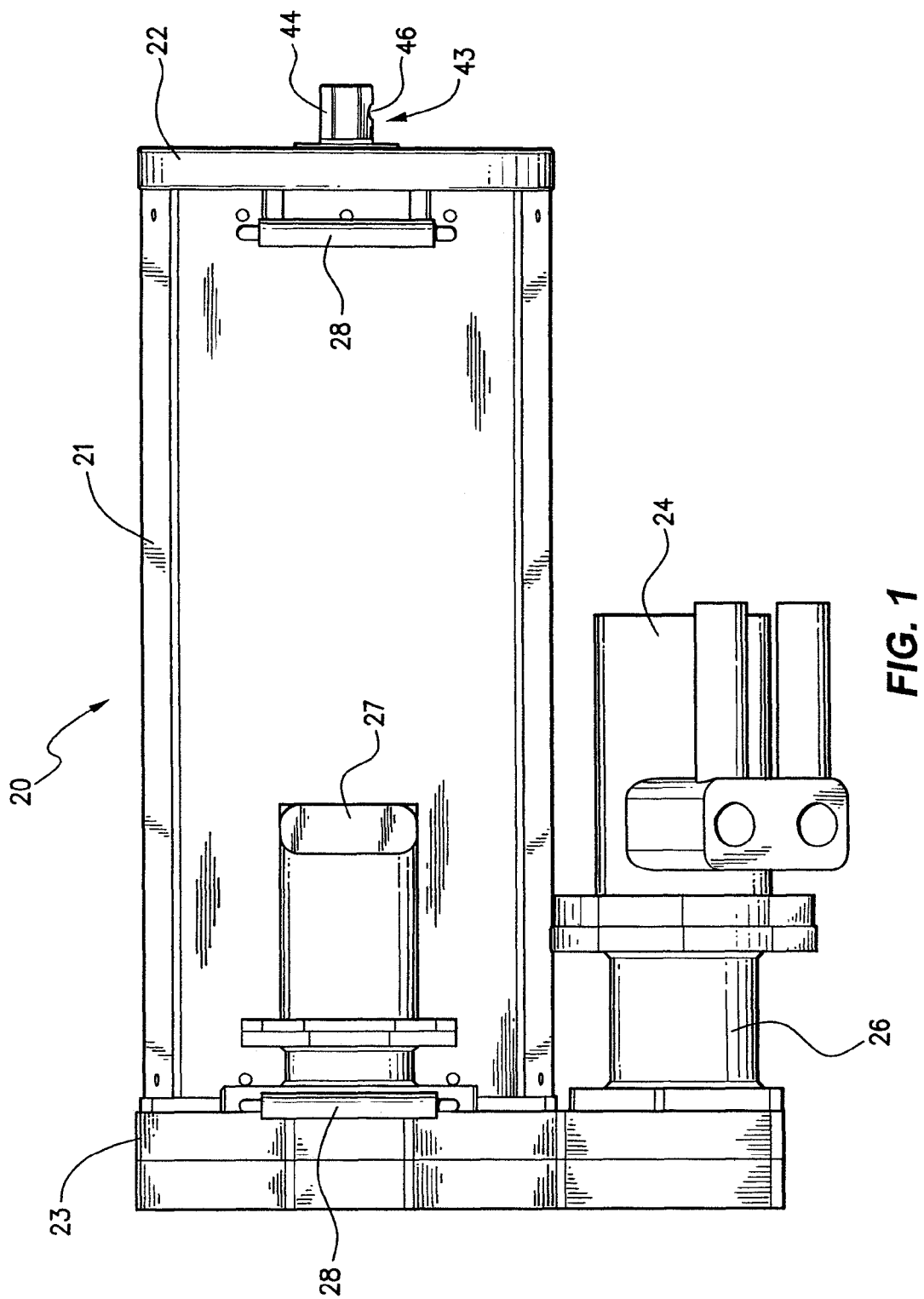
FIG. 1 is a top plan view of a drilling machine in accordance with one embodiment of the invention.

Legend
- 20. Drilling Machine
- 21. Housing
- 22. Front Plate
- 23. Rear Drive Box
- 24. Drill Drive Motor
- 25. Rear Bearing Bushes
- 26. Motor Adaptor
- 27. Advance Motor
- 28. Handles
- 29. Flange
- 30.
- 31. Cut Out Portions
- 32. Bush
- 33. **
- 34. ***
- 35.
- 36.
- 37. Drives Screws
- 38. Drill Shaft Support Tube
- 39. Front Nut
- 40.
- 41. Drill Shaft Assembly
- 42. Tubular Shaft
- 43. Drill Shat Stub
- 44. Hexagonal End
- 45.
- 46. Transverse Hole
- 47. Brackets
- 48. Drive Stub
- 49. Drive Sprocket
- 50. Drive Screw Drive Stub
- 51. Drive Sprocket
- 52. Screw Nut
- 53. Moving Plate
- 54. Inner Spine Shaft
- 55. Chain
- 56. Corresponding Sprocket
- 57. Spline Bush
- 58. Thrust Plate
- 59.
- 60. Chain
- 61. Internal Rear Nut
- 62. End Cap
- 63. Rear Flange
- 64. Thrust Washers
- 65.
- 66.
- 67.
- 68.
- 69.
- 70. Grease Access Port/Cap
- 71.
- 72. Viewing Window
- 73.
- 74. Manual Advance Override
- 75.
- 76. Lock/Catch
- 77.
- 78. Grease Nipple Referring to the drawings, the illustrated embodiment of drilling machine 20 has a housing 21 with a front plate 22, a rear drive box 23 mounted on the rear of the housing 21, a drill drive motor 24 mounted on one side of the housing 21 and connected to the drive box 23 by a motor adaptor 26, and an advance motor 27 on top of the housing 21 also connected to the drive box 23.

Figure 18:
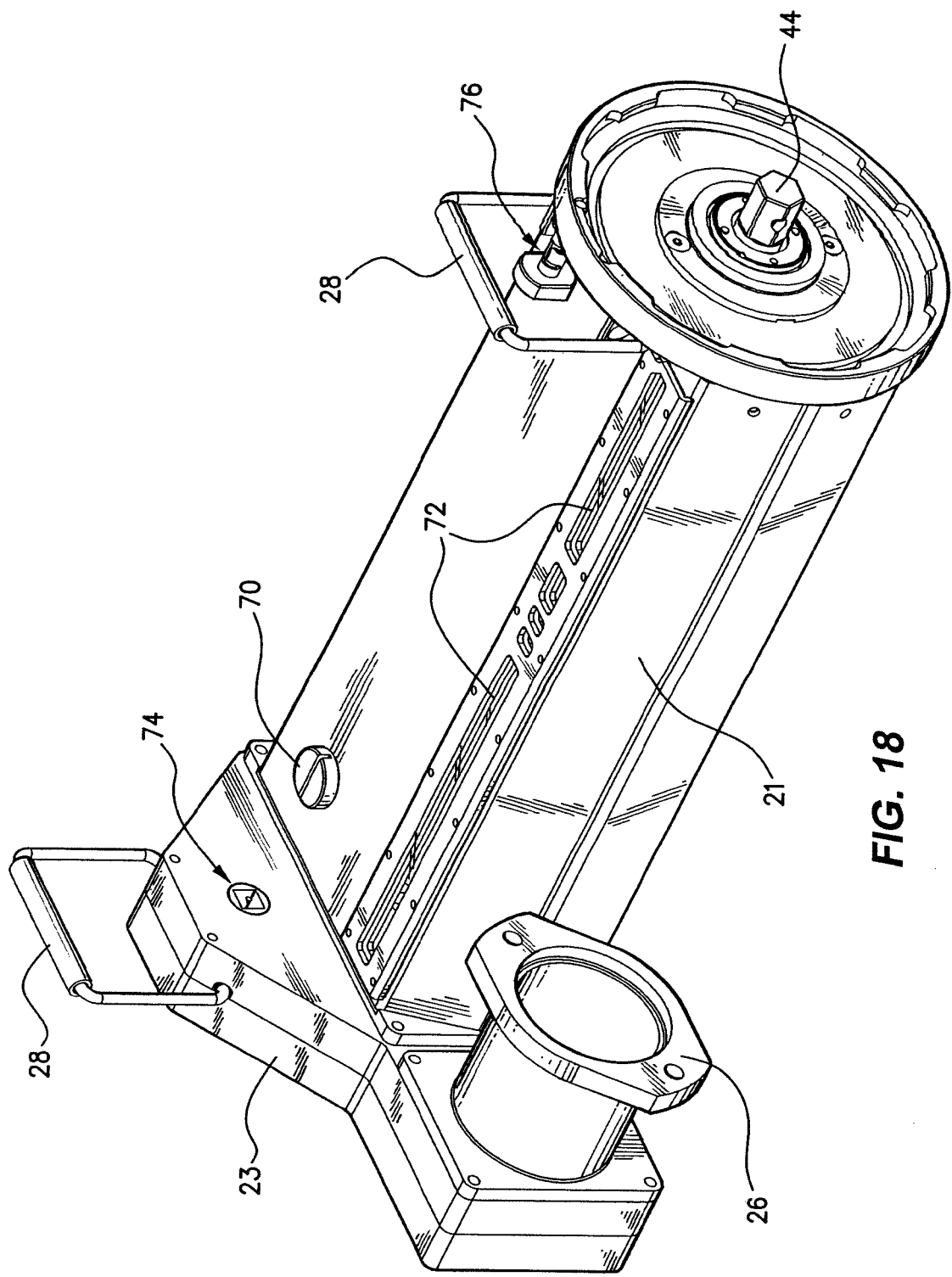
FIG. 18 is a perspective view of the drilling machine.

A pair of handles 28 enables the machine 20 to be moved into position for a drilling or tapping operation. The housing may have a viewing window 72 (as shown in FIG. 18) built into a top wall to enable an operator to see the relative position of the drill during use.

The front plate 22 is formed with a front, radially inwardly extending flange 29 having a plurality of cut out portions 31. The front plate 22 is adapted to be connected to a valve (not shown) having shoulders corresponding to the cut out portions 31 whereby the front plate 22 is engaged with the shoulders and rotated about its axis to lock the front plate to the valve. Such locating and locking cooperating surfaces enables the machine 20 to be quickly and easily engaged with and disengaged from a valve which, in use, is mounted to a pipeline or other structure to be drilled or tapped.

The bayonet locating action may be locked into position by a suitable locking means 76 which ensures the machine of the invention does not disengage from the pipeline during use.

The housing 21 and rear drive box 23 houses the components of the drill machine 20. An assembly of these components is shown generally in FIG. 3, excluding, for clarity, one of the screw drive assemblies. Various individual parts of the components are illustrated in subsequent drawings.

Figure 3:
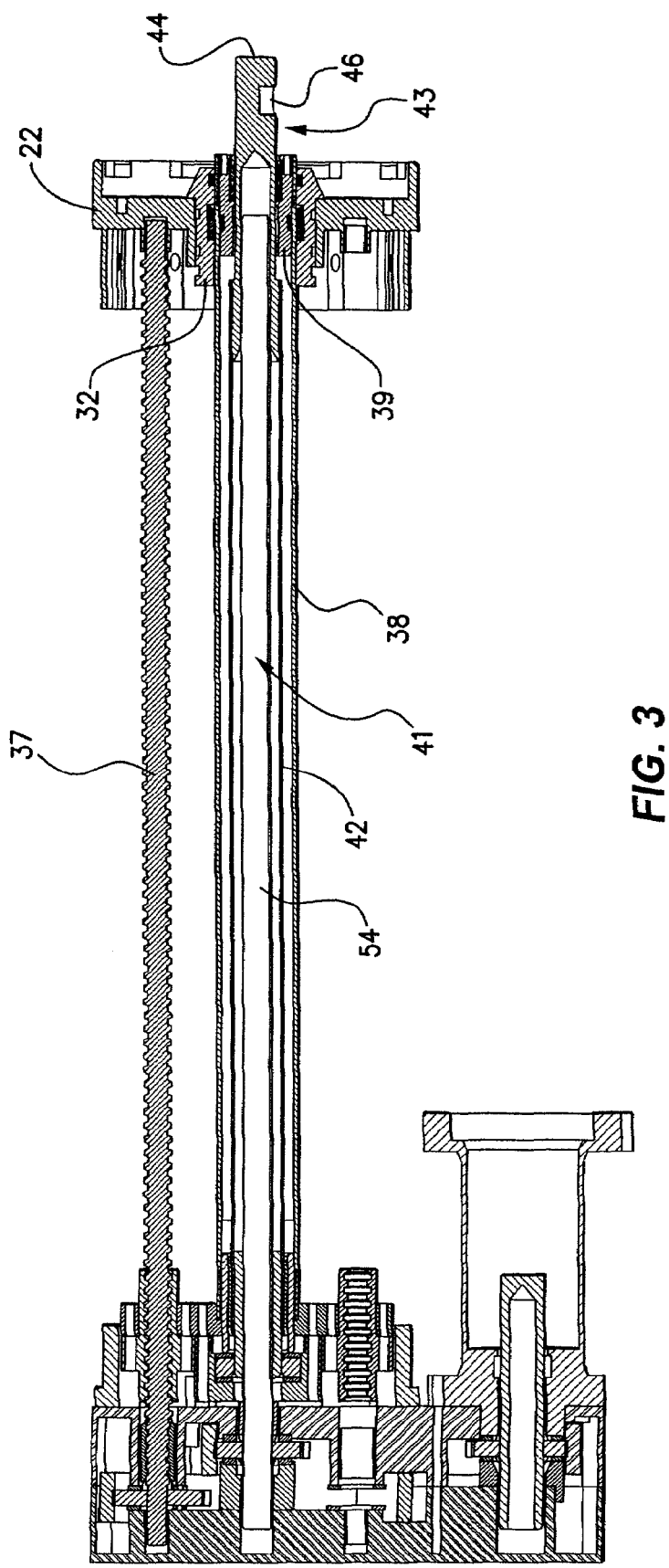
FIG. 3 is a cross sectional plan view of major components of the drilling machine of FIG. 1
Figure 4:
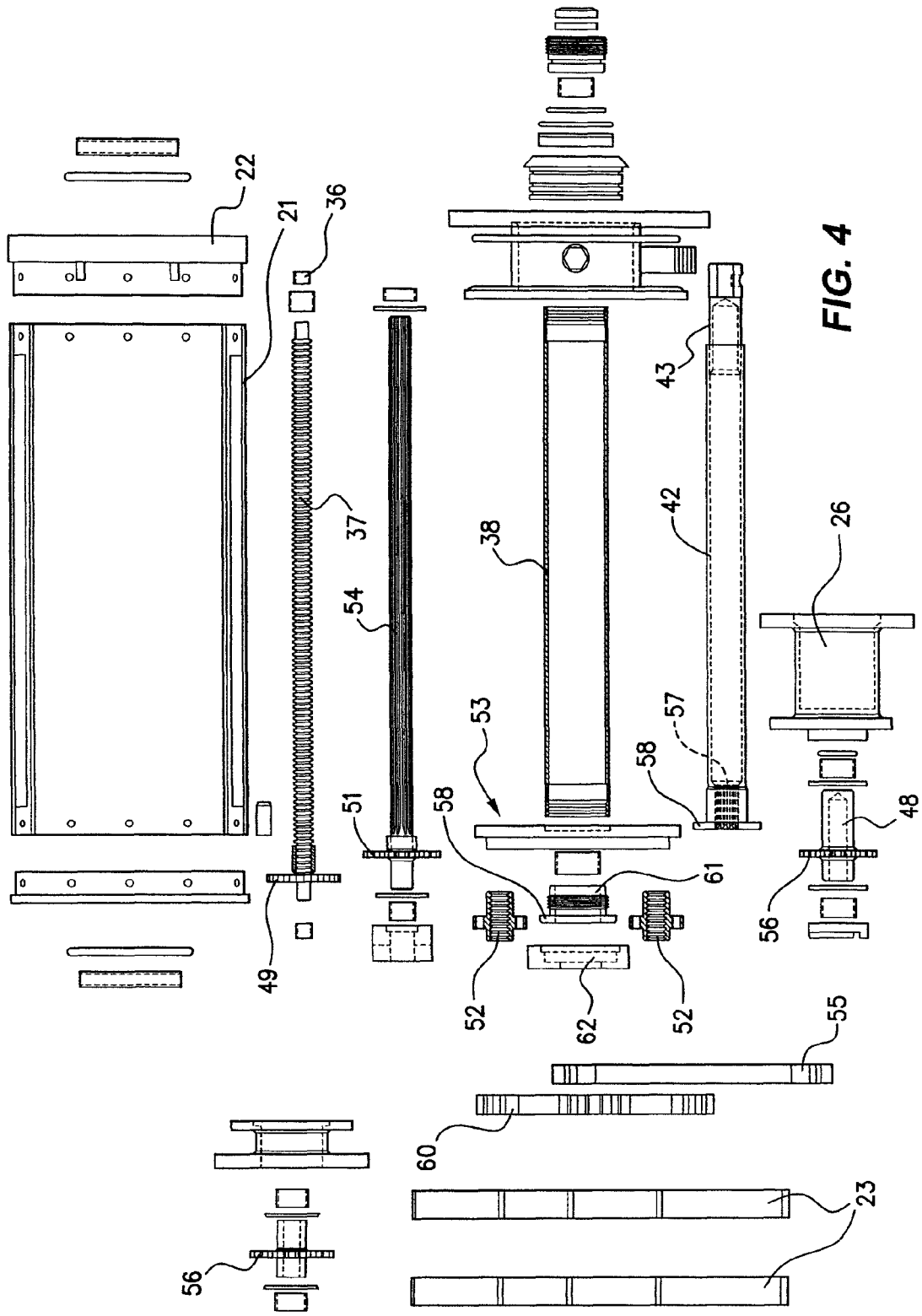
FIG. 4 is an exploded view of the components of the drilling machine of this embodiment.
Figure 6:
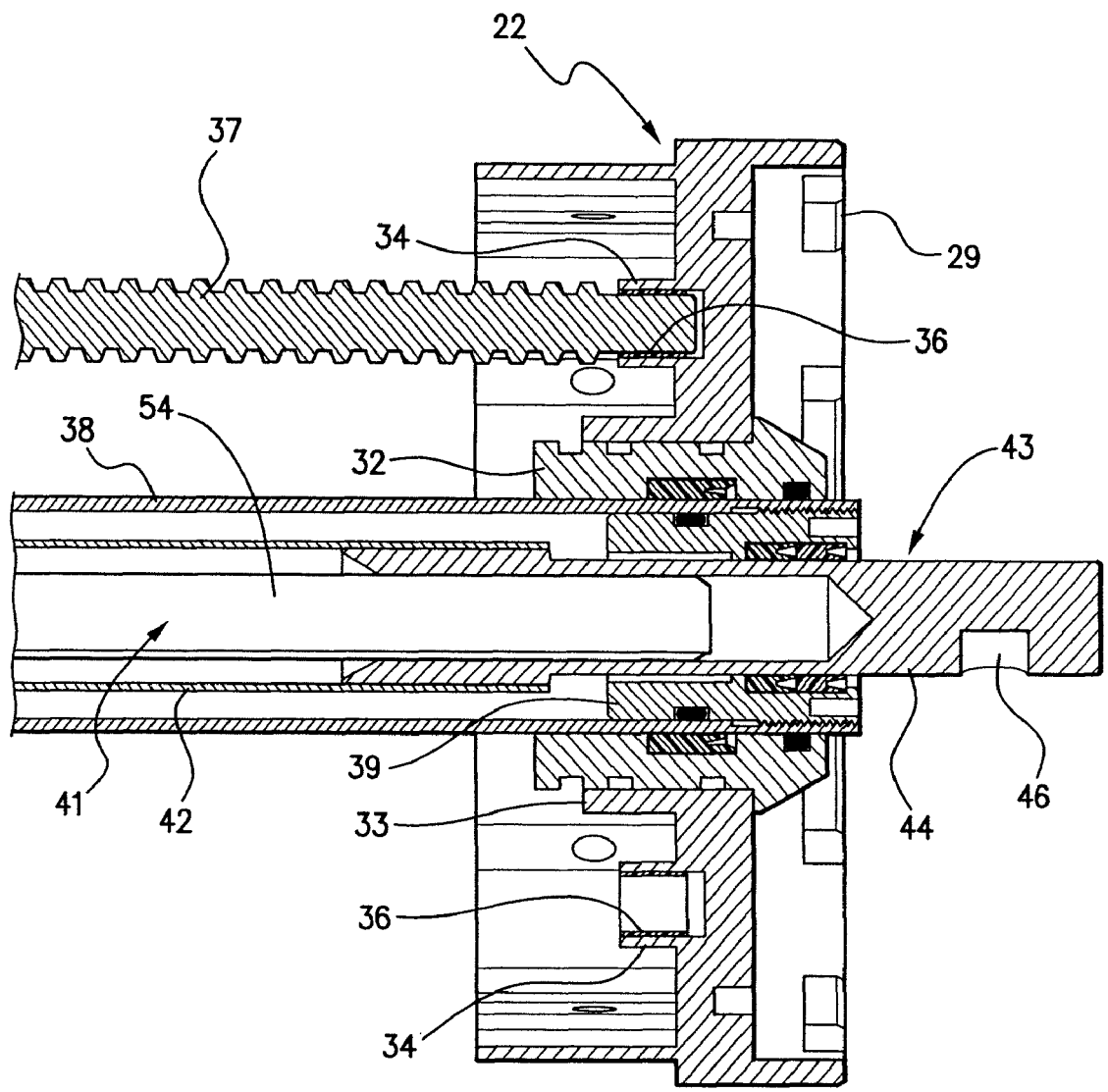
FIG. 6 is an enlarged, cross sectional plan view of the front end of the machine of FIG. 1.
Figure 8:
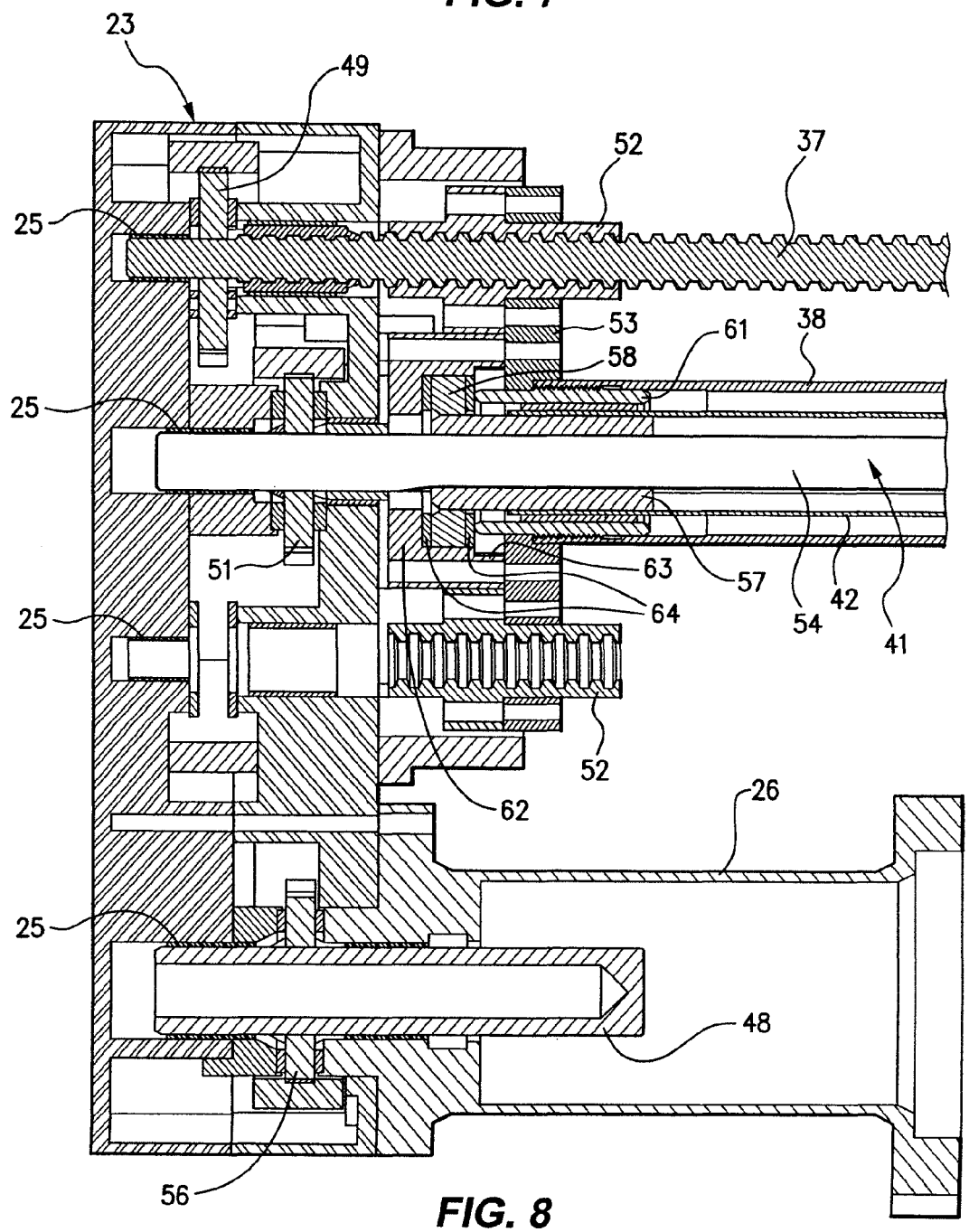
FIG. 8 is an enlarged cross sectional plan view of the rear end of the drilling machine of FIG. 1.

As shown in FIG. 3, the machine incorporates a front assembly, including the front plate 22, shown in greater detail in FIG. 6, and a rear assembly shown in greater detail in FIG. 8. FIG. 4 illustrates the various components in an exploded view.

Referring to FIG. 6, the front end assembly includes a front bronze bush 32 engaged in a boss 33 of the front plate 22. Extending rearwardly from the front plate, on each side of the boss 33, is a bearing support 34 housing a bearing 36 for each drive screw 37, only one of which is shown in FIG. 6. The bearing 36 is preferably a dry, or oilless bearing, such as a DU bush, particularly a composite dry sliding bearing.

Figure 7:
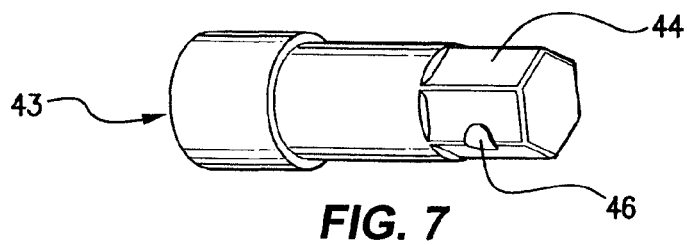
FIG. 7 is a perspective view of a drill stub.

The front bronze bush 32 slidingly supports a drill shaft support tube 38 for axial movement out of and back into the housing 21. The drive shaft support tube 38, at its front end, carries a front nut 39 threadedly engaged within the support tube 38, the front nut 39 providing a bearing support for the drill shaft assembly 41. That assembly 41 includes a tubular shaft 42 and a drill shaft stub 43 (FIG. 7) which is fixed to the tubular shaft 42 and has a hexagon shaped front end 44 with a transverse hole 46 to receive a securing pin from a circular drill (not shown) to be fitted in a know manner to the hex stub 44.

The front plate 22 is also provided with a pair of brackets 47 (FIG. 5) to which a front handle 28 is attached.

Referring to FIG. 8, the drive box 23 mounted on the rear end of the housing 21 carries rear bearing bushes 25 for the drive screws 37, the drill shaft assembly 41, a drill shaft drive stub 48 and drive screw drive stub 50. The rear end of each drive screw 37 has a drive sprocket 49 (one of which is shown in FIG. 8) and the drill shaft assembly 41 is also provided with a drive sprocket 51.

Figure 16:
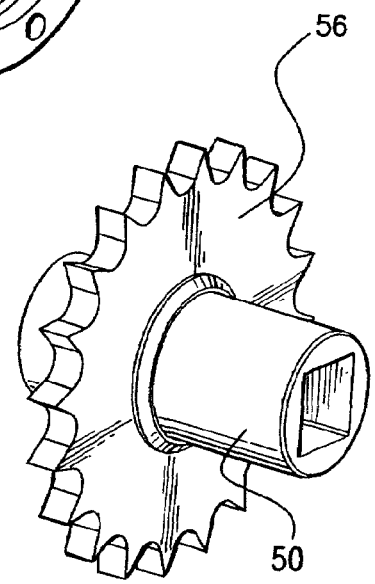
FIG. 16 is a perspective view of a drill advance driver shaft stub.
Figure 17:
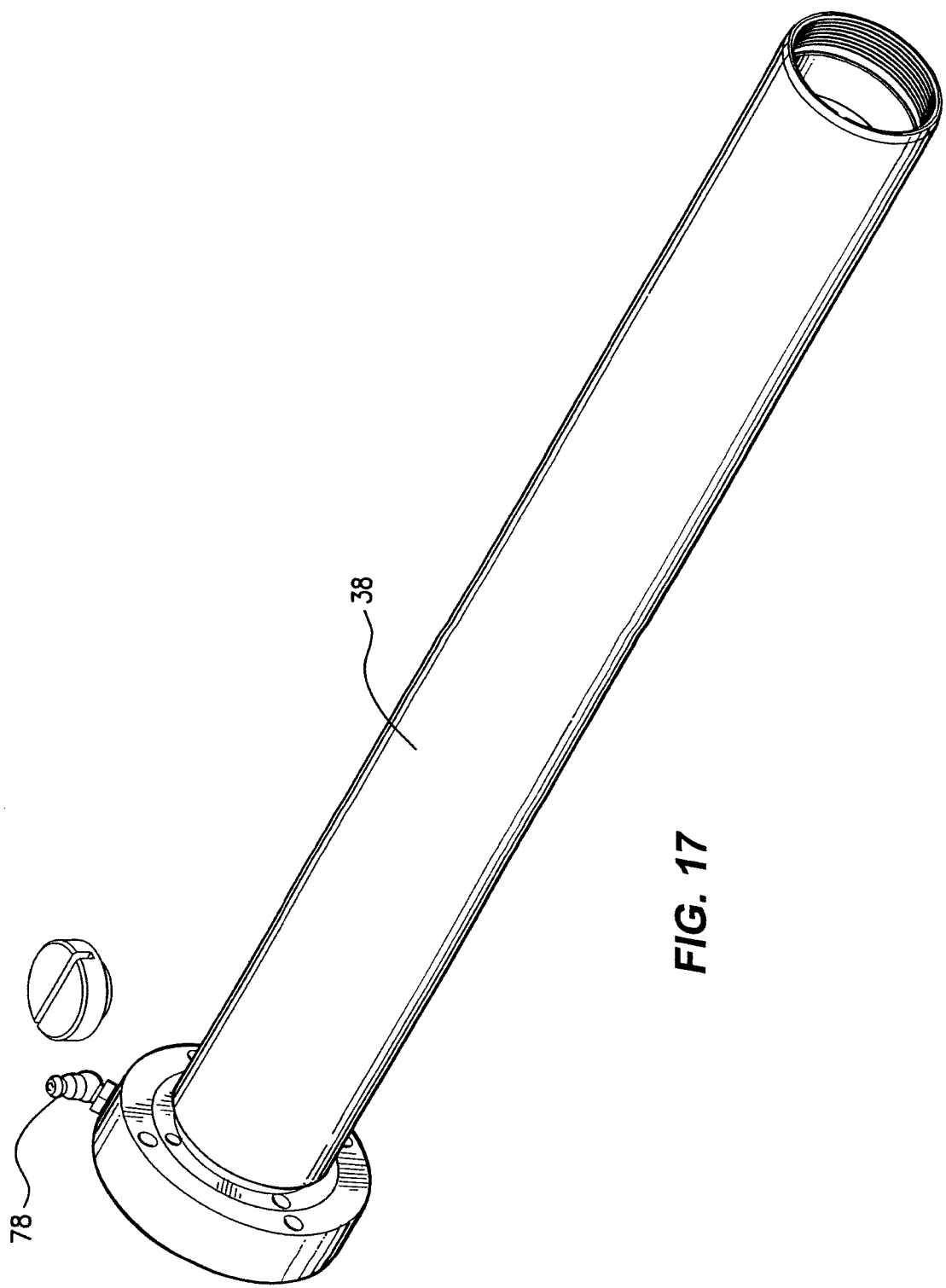
FIG. 17 is a perspective view of the drill shaft.

The drive screws 37 are each rotatably supported by the drive box 23 and extend forwardly therefrom to the front plate 22. A screw nut 52 is engaged with each drive screw 37, the screw nut 52 being attached by bolts (not shown) to a moving plate 53. Thus, as the drive screws 37 are rotated by a chain drive 60 (FIG. 4) extending around the drive sprockets 49 and a corresponding sprocket 56 (FIG. 16) on the advance motor 27, the screw nuts 52 are each moved along the drive screws 37, depending on the direction of rotation of the drive screws 37. Such movement translates to movement of the moving plate 53 axially relative to the drill shaft assembly 41.

Figure 9:
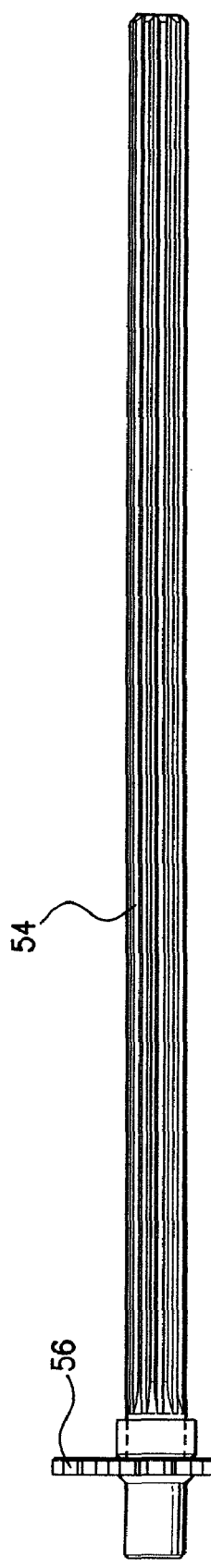
FIG. 9 is an elevational view of a spline shaft for use in the drilling machine.
Figure 10:
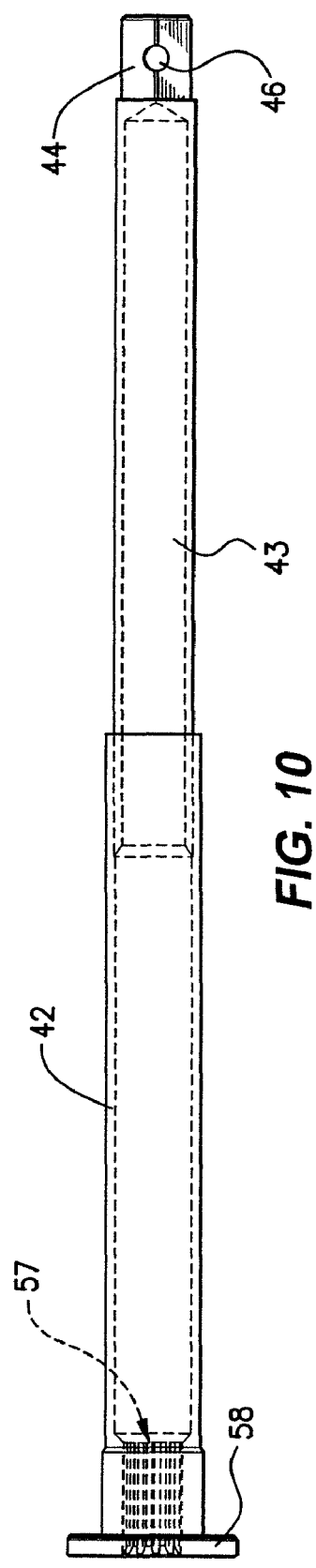
FIG. 10 is an elevational view of a drill shaft assembly.
Figure 12:
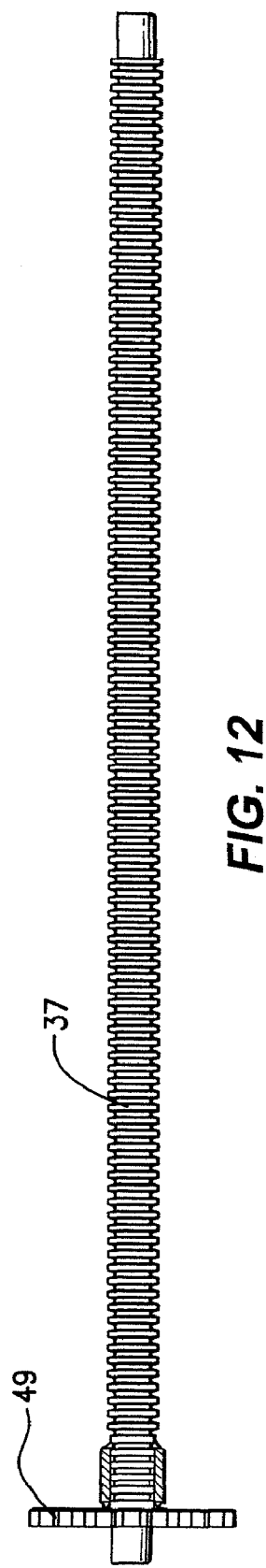
FIG. 12 is an elevational view of a screw shaft.
Figure 14:
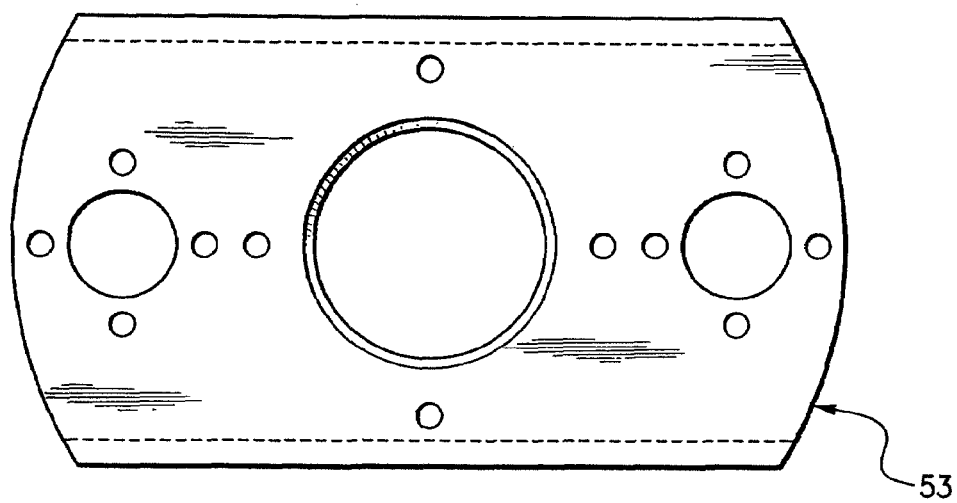
FIG. 14 is a front plan view of a moving plate.
Figure 11:
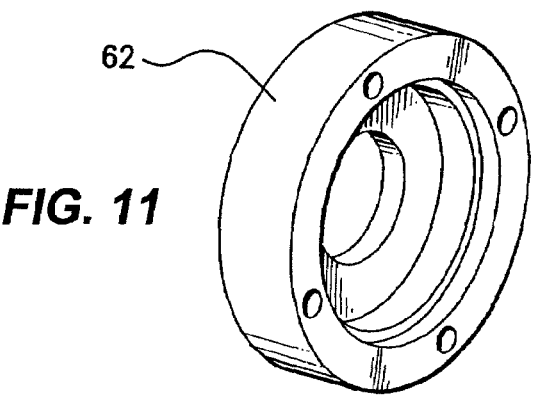
FIG. 11 is a perspective view of a rear cap.
Figure 15:
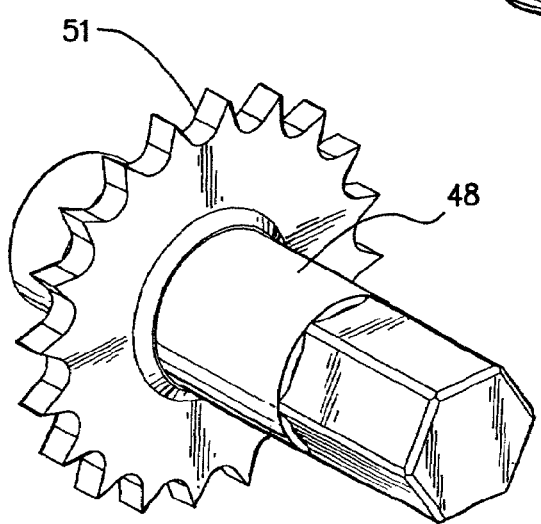
FIG. 15 is a perspective view of a drill driver shaft stub.

The drill shaft assembly 41 includes an inner spline shaft 54 (FIG. 9) to which the drill shaft drive sprocket 51 is fixed. Thus, operation of the drill motor 24 mounted on the drill mounter adaptor 26 rotates the drill shaft drive stub 48 and the drive sprocket 56 fixed thereto to drive, by a chain 55, the spline shaft sprocket 51.

The drive shaft assembly 41 further includes a spline bush 57 slidably engaged with the spline shaft 54. The spline bush 57 carries a thrust plate 58 at its rear end.

The rear end of the tubular shaft 42 engages over and is fixed to the spline bush 57, as by welding, adhesive or other securing means.

It will be appreciated that, as the spline shaft 54 is rotated as described above, the drill shaft assembly 41 rotates therewith, and is able to be axially moved relative to the spline shaft 54.

The rear end of the drill shaft support tube 38 carries an internal rear nut 61 which is threadedly engaged within the support tube 38. The front nut 39 and the rear nut 61 act as bearing supports for bearing bushes whereby the support tube 38 rotatably supports the drill shaft assembly 41. The rear nut 61 of the support tube 38 has a rear flange 63 which engages behind and is fixed to the moving plate 53. An end cap 62 engages over the thrust plate 58 and the rear nut flange 63 and it is also fixed to the moving plate 53 by bolts (not shown). Appropriate thrust washers 64 are located on each side of the thrust plate 58 whereby axial movement of the moving plate 53 effected by the rotation of the drive screws 37 results in axial movement of the drill shaft assembly 41 and the support tube 38. At the same time, the rotation of the spline shaft 54 rotates the drill shaft assembly 41 within the support tube 38. The relative axial movement of the drill shaft assembly 41 causes the drill shaft stub 43 carrying a circular drill to be moved axially relative to the front plate 22 of the housing 21 which, as previously described, is fixed to a valve or the like to enable the circular drill to cut a coupon, or wafer, from the wall of a pipeline, or to cut into any other form of vessel or structure. The rate of axial movement, or drill advance speed, will be dependent on the nature of the material through which the drill is to pass as well as the size of the hole to be cut. The advance rate is adjustable by adjusting the speed of the advance motor 27.

Moreover, the advance motor can be over ridden by use of a manual over-ride 74 which can receive a ratchet or socket for driving by hand or by a portable electric drill. The manual control of the advance of the drill allows the operator to enjoy substantial feel for the progress and action of the drill as it cuts into the pipeline.

Similarly, the speed of rotation of the circular drill, or other drill secured to the drill shaft stub 43, will be dependent on the nature of the material through which the drill is to pass.

The structure of the present invention is particularly compact and of relatively light weight due to the use of composite dry sliding bearings, bushes, thrust washers and the omission of relatively heavy and space consuming ball or roller bearings or the like. The machine as illustrated is of a weight that is able to be easily handled by a single operator facilitating economies in terms of operating personnel necessary for a pipeline tapping or drilling.

Although the preferred embodiment illustrates a structure incorporating a screw shaft drive mechanism for advancing the drill shaft assembly 41, it will be appreciated that other drill advancing means may be used, such as a hydraulic or pneumatic cylinders or the like.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

What is claimed is:

1. A drilling or tapping machine comprising:
    an elongated housing having a front end through which a drill mounting stub projects;
    a drill shaft having an inner, elongated drill tube carrying a splined bush at a rear end thereof and carrying the drill mounting stub at a front end thereof;
    a support tube substantially coaxial with but spaced from the drill tube, the support tube having front and rear bearing nuts mounting the support tube on the drill tube for relative rotation;
    a spline shaft extending through the drill tube from the rear end towards the front end, the spline shaft slidably engaged within the splined bush whereby rotation of the spline shaft rotates the drill tube in the housing;
    a moving plate fixed to the rear bearing nut and moveable axially relative to the spline shaft, the moving plate adapted to engage an inner end of the drill tube to thereby axially move the drill tube relative to the housing;
    a first drive to rotate said spline shaft; and
    a second drive to cause the moving plate to move in the axial direction.

2. A machine according to claim 1 wherein said first drive comprises one of an hydraulic and electric motor mounted on said housing and connected to said spline shaft.

3. A machine according to claim 1 wherein said second drive includes an advance motor adapted for driving a pair of threaded shafts extending substantially parallel to said spline shaft, said threaded shafts each carrying a nut connected to said moving plate.

4. A machine according to claim 1 wherein said second drive includes a manual over-ride fitted and accessible from a rear of said housing.

5. A machine according to claim 1 wherein said housing includes an elongate viewing window running a substantial length of said housing.

6. A machine according to claim 1 wherein said housing includes a front plate having a toothed flange adapted for bayonet engagement with a pipeline via a retrofitted access valve.

7. A machine according to claim 6 wherein said front plate includes a locking arrangement adapted to co-operate with said toothed flange to prevent said flange from disengaging from said pipeline when said lock is activated.

8. A machine according to claim 1 wherein said drill shaft includes an integral grease nipple positioned to correspond with a greasing access port forward in said housing.

* * * * *